(12) United States Patent
Squicciarini (10) Patent No.: US 10,618,464 B2
(45) Date of Patent: Apr. 14, 2020

(54) MODULAR LIGHT BAR ARRANGEMENT FOR EMERGENCY VEHICLES

(71) Applicant: Robert Squicciarini, Hauppauge, NY (US)

(72) Inventor: Robert Squicciarini, Hauppauge, NY (US)

(*) Notice: Subject to any disclaimer, the term of this patent is extended or adjusted under 35 U.S.C. 154(b) by 0 days.

(21) Appl. No.: 15/936,484

(22) Filed: Mar. 27, 2018

(65) Prior Publication Data

US 2018/0281672 A1 Oct. 4, 2018

Related U.S. Application Data

(60) Provisional application No. 62/481,182, filed on Apr. 4, 2017.

(51) Int. Cl.
*B60Q 1/00* (2006.01)
*B60Q 1/52* (2006.01)
*B60Q 1/26* (2006.01)
*F21V 21/14* (2006.01)
*F21S 41/19* (2018.01)

(52) U.S. Cl.
CPC .......... *B60Q 1/52* (2013.01); *B60Q 1/0041* (2013.01); *B60Q 1/0088* (2013.01); *B60Q 1/2607* (2013.01); *B60Q 1/2611* (2013.01); *B60Q 1/2657* (2013.01); *F21S 41/192* (2018.01); *F21V 21/14* (2013.01)

(58) Field of Classification Search
CPC . F21S 2/005; F21S 41/19–198; F21V 15/012; B60Q 1/0029–0058; B60Q 1/26–2642; B60Q 1/52

USPC .................. 362/249.01–249.02, 249.11, 310
See application file for complete search history.

(56) References Cited

U.S. PATENT DOCUMENTS

| 3,579,184 | A | * | 5/1971 | Forestal ............... B60Q 1/2611 340/470 |
| 4,543,622 | A | | 9/1985 | Menke |
| 4,620,268 | A | | 10/1986 | Ferenc |
| 4,722,030 | A | | 1/1988 | Bowden |
| 5,027,260 | A | | 6/1991 | Lyons |
| D324,921 | S | | 3/1992 | Stanuch |
| 5,162,696 | A | | 11/1992 | Goodrich |
| 5,452,188 | A | | 9/1995 | Green |
| 5,884,997 | A | | 3/1999 | Stanuch |
| 5,931,673 | A | | 8/1999 | Knox |

(Continued)

FOREIGN PATENT DOCUMENTS

WO    WO 00/06420    2/2000

*Primary Examiner* — Gerald J Sufleta, II
(74) *Attorney, Agent, or Firm* — Thomas A. O'Rourke; Bodner & O'Rourke, LLP (57) ABSTRACT

A modular light bar, for mounting on an emergency vehicle, is configured for changing of a portion of its external shape for changing a corresponding light directional capability thereof using interchangeable lighting modules. The lights thereon cast light in multiple lighting directions without using any rotating elements. The modular light bar includes: a base member with a first light bar end section and a second light bar end section interconnected by a support portion configured to provide a gap between the first and second light bar end sections. Various different center section lighting modules may be interchangeably received in the gap between the first light bar end section and the second light bar end section, and be latched thereto.

10 Claims, 10 Drawing Sheets

(56) References Cited

U.S. PATENT DOCUMENTS

| | | | |
|---|---|---|---|
| 6,140,918 A * | 10/2000 | Green | B60Q 1/2611 340/332 |
| 6,623,151 B2 | 9/2003 | Pederson | |
| 6,966,682 B2 | 11/2005 | Frank | |
| 7,244,053 B2 * | 7/2007 | Bader | B60Q 1/2611 362/487 |
| D564,928 S | 3/2008 | Belitz | |
| 7,789,530 B2 | 9/2010 | Stein | |
| 7,825,790 B2 | 11/2010 | Tallinger | |
| D652,335 S | 1/2012 | Deyaf | |
| 8,966,795 B1 * | 3/2015 | Shipman | B60Q 1/503 40/592 |
| 9,002,313 B2 | 4/2015 | Sink | |
| 9,004,730 B2 * | 4/2015 | LaVigna | F21V 21/00 362/426 |
| 9,202,397 B1 * | 12/2015 | Petrocy | G09F 13/005 |
| 9,550,454 B1 | 1/2017 | Gergets | |
| 2002/0048174 A1 * | 4/2002 | Pederson | B60Q 1/2611 362/487 |
| 2005/0047167 A1 | 3/2005 | Pederson | |
| 2005/0259434 A1 * | 11/2005 | Pederson | B60Q 1/2611 362/555 |
| 2007/0242472 A1 * | 10/2007 | Gergets | B60Q 1/2611 362/493 |
| 2007/0258239 A1 * | 11/2007 | Stein | B60Q 1/2611 362/227 |
| 2007/0258257 A1 * | 11/2007 | Stein | B60Q 1/2611 362/493 |
| 2009/0096362 A1 * | 4/2009 | Diekmann | H01L 25/048 313/504 |
| 2009/0207612 A1 * | 8/2009 | Datz | B60Q 1/2611 362/249.14 |
| 2010/0118534 A1 * | 5/2010 | Lo | F21S 2/005 362/249.02 |
| 2010/0321177 A1 * | 12/2010 | Burke | B60Q 1/2611 340/468 |
| 2012/0063138 A1 * | 3/2012 | Leadford | F21S 2/005 362/249.02 |
| 2012/0113666 A1 * | 5/2012 | Slipp | B60Q 1/2611 362/523 |
| 2012/0230030 A1 * | 9/2012 | Miller | F21S 2/005 362/249.01 |
| 2014/0126208 A1 * | 5/2014 | Speer | F21S 2/005 362/249.02 |
| 2015/0167948 A1 * | 6/2015 | Wasserman | F21S 2/005 362/249.01 |
| 2015/0251592 A1 * | 9/2015 | Fisher | B60Q 1/2611 362/548 |
| 2016/0123569 A1 * | 5/2016 | Cummings | F21S 2/005 362/249.02 |
| 2017/0120805 A1 * | 5/2017 | Marchese | B60Q 1/0483 |

* cited by examiner

MODULAR LIGHT BAR ARRANGEMENT FOR EMERGENCY VEHICLES

CROSS REFERENCES TO RELATED APPLICATIONS

This application claims priority on U.S. Provisional Patent Application Ser. No. 62/481,182 filed on Apr. 4, 2017, the disclosures of which are incorporated herein by reference.

FIELD OF THE INVENTION

The present invention relates to emergency vehicle roof fixtures, and in particular to a light bar configured to interchangeably receive accessories thereon, including various configurations of lights bar modules to form different light bar assemblies that provide different light directional capabilities without the use of rotating elements.

BACKGROUND OF THE INVENTION

Emergency responders utilize vehicles that necessarily must easily and quickly navigate through traffic to reach the site of the accident or crisis that requires their service. To alert other motorists to safely bypass traffic on congested roadways and at intersections, these vehicles utilize a system of lights and speakers/sirens. Although lights may also be positioned behind the front grill, such emergency vehicles typically are outfitted with a light bar on the vehicle's roof. There have been a number of emergency vehicle lighting arrangements, as follows.

U.S. Pat. No. 4,543,622 to Meinke discloses a light bar that uses a thin flat elongate base with a-plurality of holes of such number that they may accommodate mounting of a multiplicity of components, such as lamps, a siren, and circuity.

U.S. Pat. No. 4,620,268 to Ferene discloses a warning light assembly for mounting to a vehicle roof, which provides improved aerodynamic characteristics by minimizing its profile.

U.S. Pat. No. 5,027,260 to Lyons discloses a light bar assembly that has an elongated base, with lens elements mounted thereto, and warning beacon units mounted to platforms supported on the base.

U.S. Pat. No. 5,452,188 to Green discloses a light bar with a plurality of modules, including a strobe lamp and associated circuitry, which may be replaced without having to service the power supply connected to the module.

U.S. Pat. No. 5,884,997 to Stanuch discloses a light bar that uses trays for mounting lights, where the trays are integral members with cells for receiving components of light fixtures forming a lower tier, and an upper tier of lights may be mounted on the tops of the trays.

U.S. Pat. No. 7,789,590 to Stein discloses a light bar that utilizes modules, each of which may have two horizontal layers of lighting that are connected to a terminal strip, which is coupled to a controller using a quick-disconnect feature.

The present disclosure provides several different light bar arrangements.

OBJECTS OF THE INVENTION

It is an object of the invention to provide a light bar that may be used on the roof of an emergency vehicle.

It is another object of the invention to provide a light bar for an emergency vehicle that utilizes a base with end sections supported thereon, and which is configured to interchangeably support one of a plurality of different center section lighting modules.

It is a further object of the invention to provide a light bar base having end sections forming a central recess therebetween that may interchangeably receive one of a plurality of center section modules, each with different shapes/sizes, and lighting characteristics.

It is another object of the invention to provide a light bar configured to receive interchangeable center section lighting modules that are securable to a base unit without the use of tools.

It is also an object of the invention to provide a light bar configured to receive interchangeable center section lighting modules using quick release mechanical and electrical connections.

Further objects and advantages of the invention will become apparent from the following description and claims, and from the accompanying drawings.

BRIEF DESCRIPTION OF THE DRAWINGS

The description of the various example embodiments is explained in conjunction with appended drawings, in which.

DETAILED DESCRIPTION OF THE INVENTION

As used throughout this specification, the word "may" is used in a permissive sense (i.e., meaning, having the potential to), rather, than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" means all of the following possible combinations: A alone; or B alone; or C alone; or A and B together; or A and C together; or B and C together; or A, B and C together.

Also, all references (e.g., patents, patent publications, and non-patent literature) that are cited within this documents are incorporated herein in their entirety by reference.

Furthermore, the described features, advantages, and characteristics of any particular embodiment disclosed in the following specification, may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from a stack up (i.e., the sum) of multiple individual tolerances.

It is further noted that any use herein of relative terms such as "top," "bottom," "upper," "lower," "vertical," and "horizontal" are merely intended to be descriptive for the reader, based on the depiction of those features within the figures for one particular position of the device, and such terms are not intended to limit the orientation with which the device of the present invention may be utilized.

Figure 1:
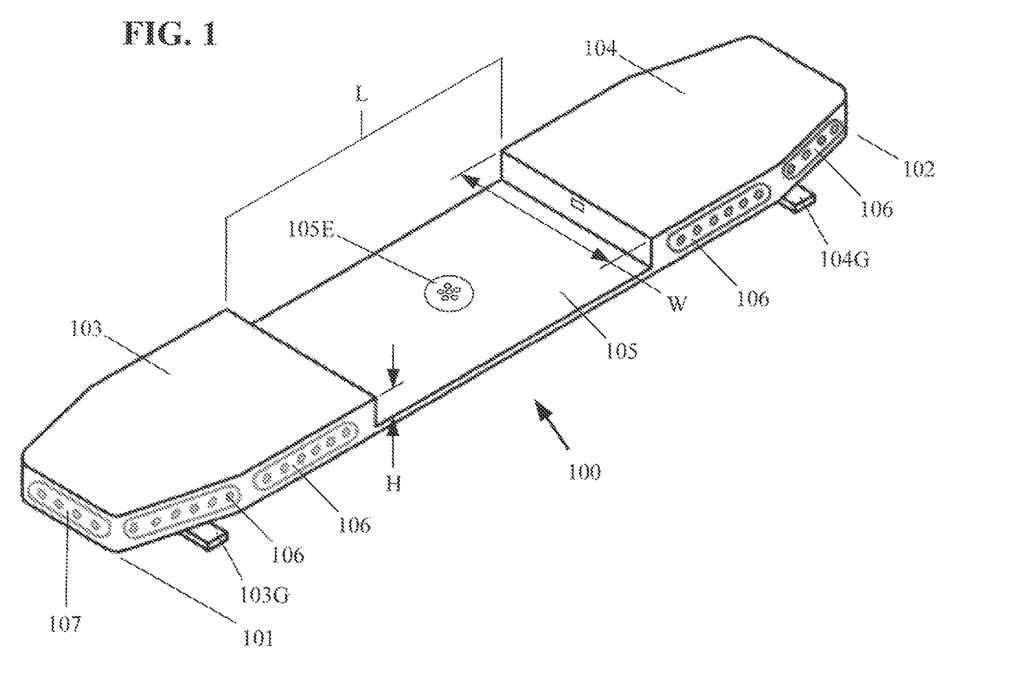
FIG. 1 illustrates a perspective view of a first embodiment of a light bar base member formed in accordance with the present invention, having two end sections interconnected with a support section to form a recess configured to interchangeably receive a center section lighting module therebetween.
Figure 2:
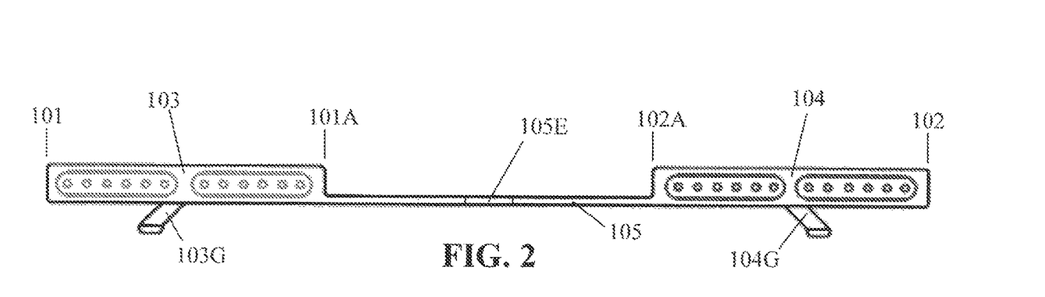
FIG. 2 is a front view of the base member shown in FIG. 1.

FIG. 1 illustrates a perspective view of a light bar base member 100 formed in accordance with the present invention. Light bar base member 100 may have an elongated shape that may span across the roof of a car, SUV, or other vehicle, and the base member may extend from a first end 101 to a second end 102. Light bar base member 100 may have a first light bar end section 103 beginning at the first end 101 and extending part way toward the second end 102, terminating at a surface 101A (FIG. 2). Light bar base member 100 may also have a second light bar end section 104 that may begin at the second end 102 of the base member and may extend part way toward the first end 101, terminating at a surface 102A. A support portion 105 may be configured to join/interconnect the first light bar end section 103 to the second light bar end section 104. It should be noted that while the light bar base member 100 is described in terms of being formed by the first and second light bar end sections 103/104 and the support portion 105, these sections/portions may be separate components in one embodiment that are assembled and fixedly secured together, but in another embodiment may instead be integrally formed as a single unitary article, as shown in FIG. 1.

The support portion 105 may be sized to provide a particular length L of separation between surface 101A and surface 102A. The surfaces 101A and 102A may be substantially flat and parallel, and may each form a rectangular-shaped periphery having a width W. Each of the first and second light bar end sections 103/104 may also have coplanar flat upper surfaces, which may be positioned at a height H above, and parallel to, a substantially flat upper surface of the support portion 105 (see FIGS. 1-2). The height H, and the length L, and also even the width W may be particularly controlled, so that various different interchangeable center light bar components may be releasably received within the recess thereby formed, as discussed hereinafter.

Each of the light bar end sections 103/104 may have one or more lights on one or more of its surface. In one embodiment, the light bar end sections 103/104 may have one or more lights on its vertical front and/or rear and/or side surfaces. The lights may be individual lights, such as incandescent/florescent bulbs, LEDS, etc., or may instead be one or more light panels 106 secured to one or more of those surfaces. The light panels 106 may be an assembly that may include a plurality of such bulbs, and/or LEDS, etc.

Each of the light bar end sections 103/104 may also have a respective support leg 103G/104G protruding from a bottom surface thereof, which legs may be used to mount the light bar to the roof of the vehicle, using suitable mechanical fasteners. Alternatively, the support legs may protrude from the support portion 105. A suitable electrical connection may be used to supply power to each of the end sections 103/104 (and the interchangeable center section lighting components) from a power source, which in one embodiment may be a battery within one or both of the end sections, and in another embodiment may be the vehicle's battery. One or both of the support legs 103G/104G may accommodate (e.g., may be hollow to house a portion of) wiring that may electrically couple the light bar 100 to the vehicle's battery.

The recessed area of the light bar base 100 formed by the reduced height of the support portion 105, as compared with the height of each of the end sections 103/104, may form a rectangular shaped recess, that may be particularly configured to interchangeably receive any one of a plurality of different center section lighting modules, and in a quick connect/disconnect manner.

Figure 2A:
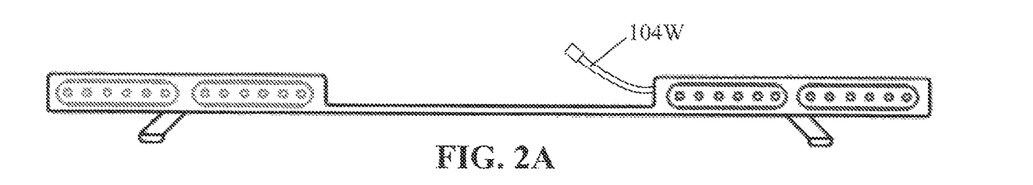
FIG. 2A is a front view of an alternative embodiment of the base member of FIG. 2, shown with a different electrical connector and with a cable extending out from a side of one of the end sections.

The support portion 105 may thus include a first electrical connector 105E that may be configured to be releasably coupled to a second electrical connector that may be correspondingly mounted within each of the center section modules discussed hereinafter. The support member 105 may include a female electrical connector 105E that may generally be as shown in FIG. 5 of U.S. Pat. No. 3,432,795 to Jayne, which is configured to receive the pins of the male connector shown therein. Thus, as a center section module may be inserted into the recess between the end sections 103/104, the pins of a male connector fixedly mounted therein, the same as in FIG. 5 of Jayne, may simultaneously be inserted into the corresponding receiving elements of the female connector 105E in the support member 105. Furthermore, any other suitable type of electrical connections may be utilized. For example, a coaxial connector such as the one shown by U.S. Pat. No. 5,934,937 to McCarthy, or the quick disconnect electrical connector shown by U.S. Pat. No. 3,723,944 to Gauchat, or the sliding boot connector shown by U.S. Pat. No. 5,435,744 to Derstine may alternatively be used in various different embodiments. Such connector types may require use of electrical cables or a wire harness (see e.g., the cable 104W for the base member 100A shown in FIG. 2A), and may also require that the electrical connections be made prior to actually inserting and securing of the center section module in the recess between the end sections 103/104.

Figure 3:
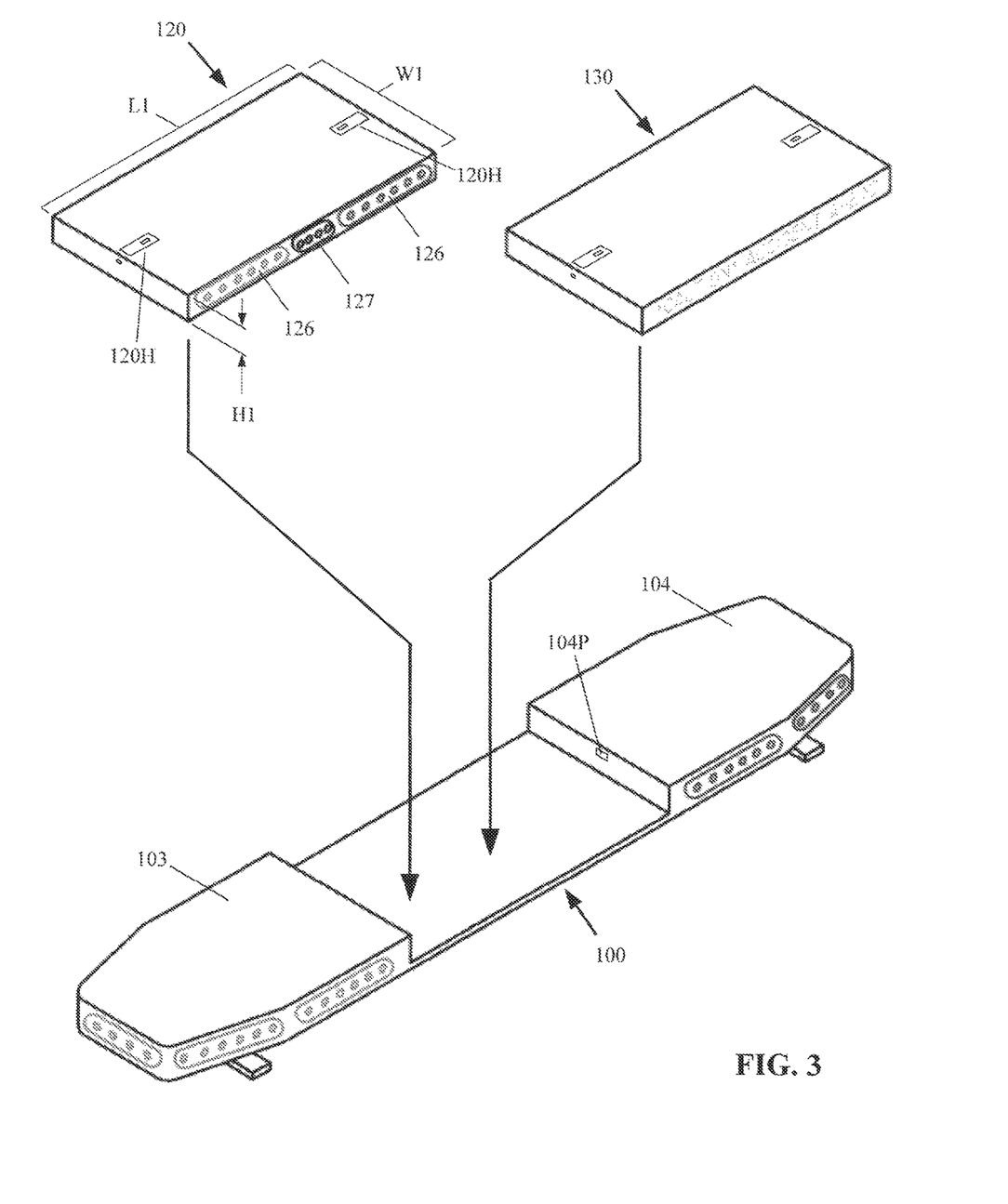
FIG. 3 is an exploded view showing the base member of FIG. 1, with two different interchangeable rectangular-shaped center section lighting modules, either of which may be releasably received within the recess of the base member shown therein.

FIG. 3 shows a first center section lighting module 120 and a second center section lighting module 130, each of which may have a generally rectangular cross-sectional shape, including a substantially flat bottom surface and a substantially flat and parallel upper surface.

Each of the center section lighting modules 120/130 may have a length L1 that may be less than the length L between surface 101A and surface 102A of the base 100, to provide a clearance fit therebetween, so that the center section lighting modules may be interchangeably received within the recess of the base member. In another embodiment each of the center section lighting modules may have a length L1 that is comparable to the length L between surface 101A and surface 102A of the base 100, to provide a slight interference fit (i.e., a friction fit) therebetween. The center section lighting modules 120/130 may also have a height H1 that may be the same as the recess height H of the light bar base member 100, so that the top surface of the center section lighting module, which may be flat, may be flush with the top surface of the end sections 103/104 (see FIG. 5). The center section lighting modules 120/130 may also have a width W1 that may be the same as the width W of each of the end sections 103/104, so that the front and back surfaces of the center section lighting module, which may be flat, may be flush with the corresponding surfaces of the end sections 103/104 (see FIG. 4).

The center section lighting module 120 may have one or more lights on its front and/or rear peripheral surfaces, which may be individual lights or may instead be one or more light panels 126 secured to those surfaces. Different types of light panels, including a light panel 127 and multiple light panels may also be secured thereto, to include different colors and/or to provide different numbers of lights and different types of lighting. The center section module 130 may have lights configured thereon to spell out a particular message on its front and/or rear peripheral surfaces (e.g., "Caution—Accident Ahead"), or alternatively, its front and rear surfaces may include a plurality of LED elements that may be configured to display any message entered into the system, which may be entered directly via the vehicle's onboard computer, or remotely using a notebook computing device, tablet PC, mobile phone, etc.

Figure 4:
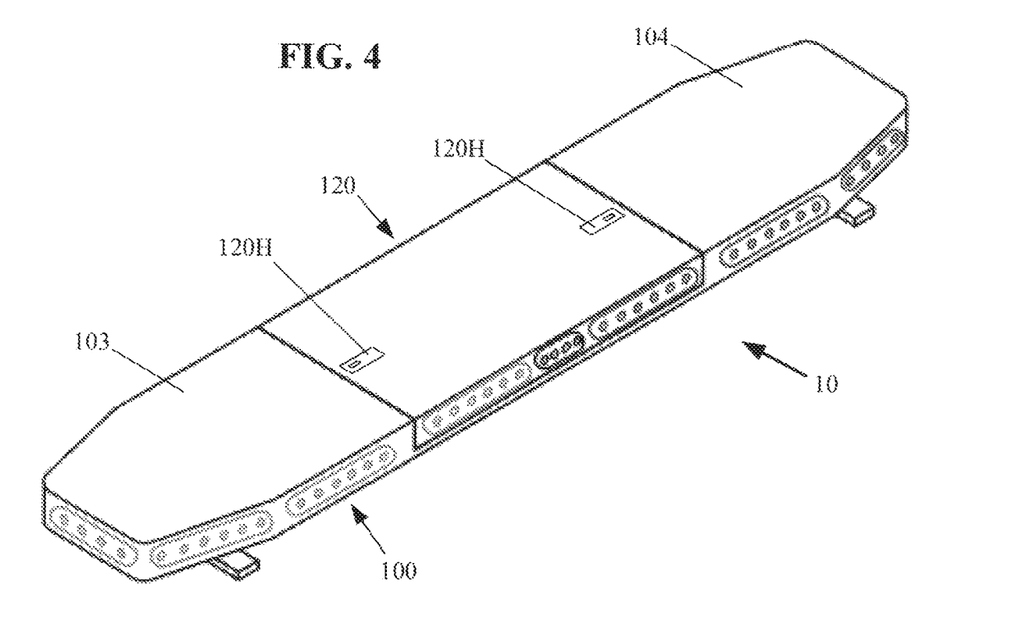
FIG. 4 is a perspective view of the base member of FIG. 1 shown with one of the interchangeable rectangular center section lighting modules of FIG. 3, after being received within the recess in the base member.
Figure 5:
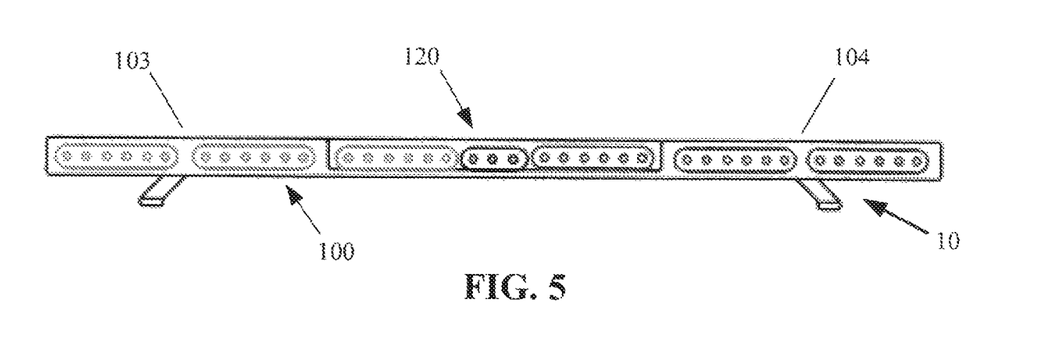
FIG. 5 is a front view of the base member and center section lighting module, as shown in FIG. 4.

Each of the light bar arrangements may have a latch that may be used to quickly secure the interchangeable center section modules to the base member 100. For example, a sliding latch 120H such as the one disclosed by U.S. Pat. No. 4,790,579 to Maxwell, may be used on each side of the module 120/130, as shown in FIG. 3. The latch may alternatively be as shown in U.S. Pat. No. 1,549,470 to Egbert; U.S. Pat. No. 3,850,464 to Bisbing; and U.S. Pat. No. 5,878,608 to Alyanakian. Any other latch suitable for securing a sliding member or a removable panel/member may alternatively be used. After the interchangeable module 120/130 is inserted into the recess in the base member 100, the latch body may be slid for a portion thereof to releasably engage within an opening (e.g., 104P) in the adjacent end section 103/104, as shown in FIG. 4. In another embodiment, rather than using two such latches, each module may have only one latch on one of its ends, and the other end of the module may be configured to be inserted beneath an overhanging portion of the opposite end section, to thereby be retained, while the first end is secured to the adjacent end section through use of the latch. Other latching schemes may also be used in other embodiments.

Figure 8A:
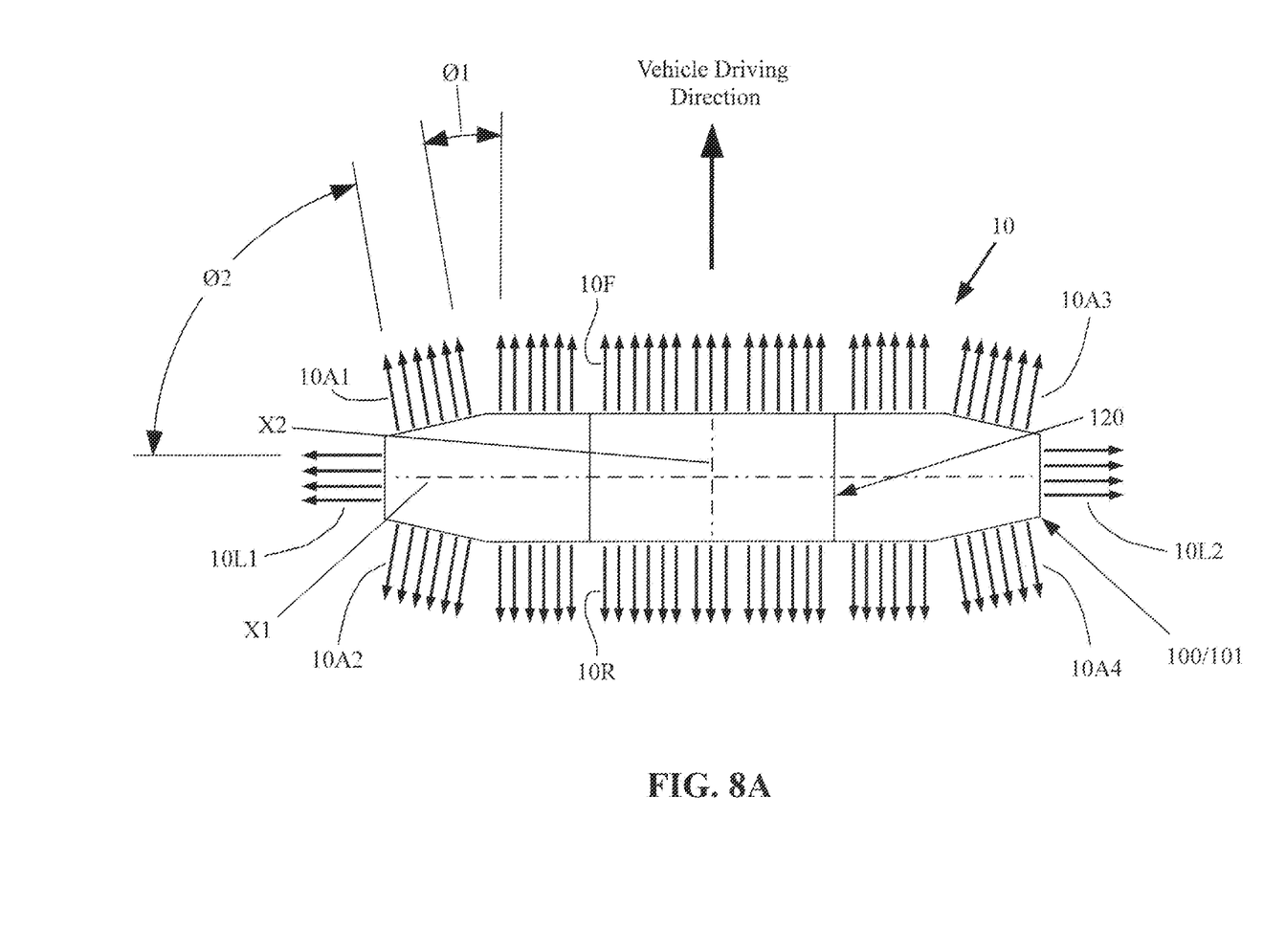
FIG. 8A is a top view of the base member and one of the rectangular center section lighting modules shown in FIG. 3, after being installed with respect to the base member, and showing the lighting directions produced therefrom.

FIG. 8A illustrates the various lighting directions provided by the combination of the base member 100 and the interchangeable center section lighting module 120. As seen, in FIGS. 4-5, the interchangeable center section lighting module 120 may have a rectangular cross-sectional shape with one or more lights on a first surface thereon (i.e., the surface that may face the forward driving direction of the vehicle), and one or more lights on a second surface thereof (i.e., the surface that may face the rear of the vehicle). Therefore, as seen in FIG. 8A, the modular light bar 10 formed by the combination of the base member 100 and the interchangeable center section lighting module 120 may have light directional capability that may include:

- one or more lights on the first light bar end section directed in the forward direction 10F;
- one or more lights on the first light bar end section directed in a first lateral direction 10L1, which may be at a 90 degree angle to the forward direction 10F (i.e., $\ominus1+\ominus2=90$ degrees);
- one or more lights on the first light bar end section directed in a direction 10A1 at an acute angle to the forward direction 10F, being angled towards the first lateral direction 10A1, which may be at an angle $\ominus1$ to the forward direction 10F, with $\ominus1$ being between 3 degrees and 87 degrees in one embodiment, and between 5 degrees and 50 degrees in another embodiment, and between 10 degrees and 25 degrees in yet another embodiment (note other angular ranges may be used in other embodiments);
- one or more lights on the first light bar end section directed in a rearward direction 10R;
- one or more lights on the first light bar end section directed at a direction 10A2 at a second acute angle, which may be the same angular value as for the first acute angle for the direction 10A1, but is with respect to the rearward direction 10R, and may be angled towards the first lateral direction 10L1 (e.g., the direction 10A2 may be the direction 10A1 mirrored about the long axis X1);
- one or more lights on the second light bar end section directed in the forward direction 10F;
- one or more lights on the second light bar end section directed in a second lateral direction 10L2, which may be at a 90 degree angle to the forward direction 10F (e.g., the direction 10L2 may be the direction 10L1 mirrored about the short axis X2);

one or more lights on the second light bar end section directed in a direction 10A3 at an acute angle to the forward direction 10F, and may be angled towards the second lateral direction 10L2 (e.g., the direction 10A3 may be the direction 10A1 mirrored about the short axis X2);

one or more lights on the second light bar end section directed in the rearward direction 10R; and one or more lights on the second light bar end section directed in a direction 10A4 at acute angle to the rearward direction 10R, and may be angled towards the second lateral direction 10L2 (e.g., the direction 10A4 may be the direction 10A3 mirrored about the long axis X1);

one or more lights on the first surface of the rectangular center section lighting module 120 directed in the forward direction 10F; and one or more lights on the second surface of the rectangular center section lighting module 120 directed in the rearward direction.

Figure 6:
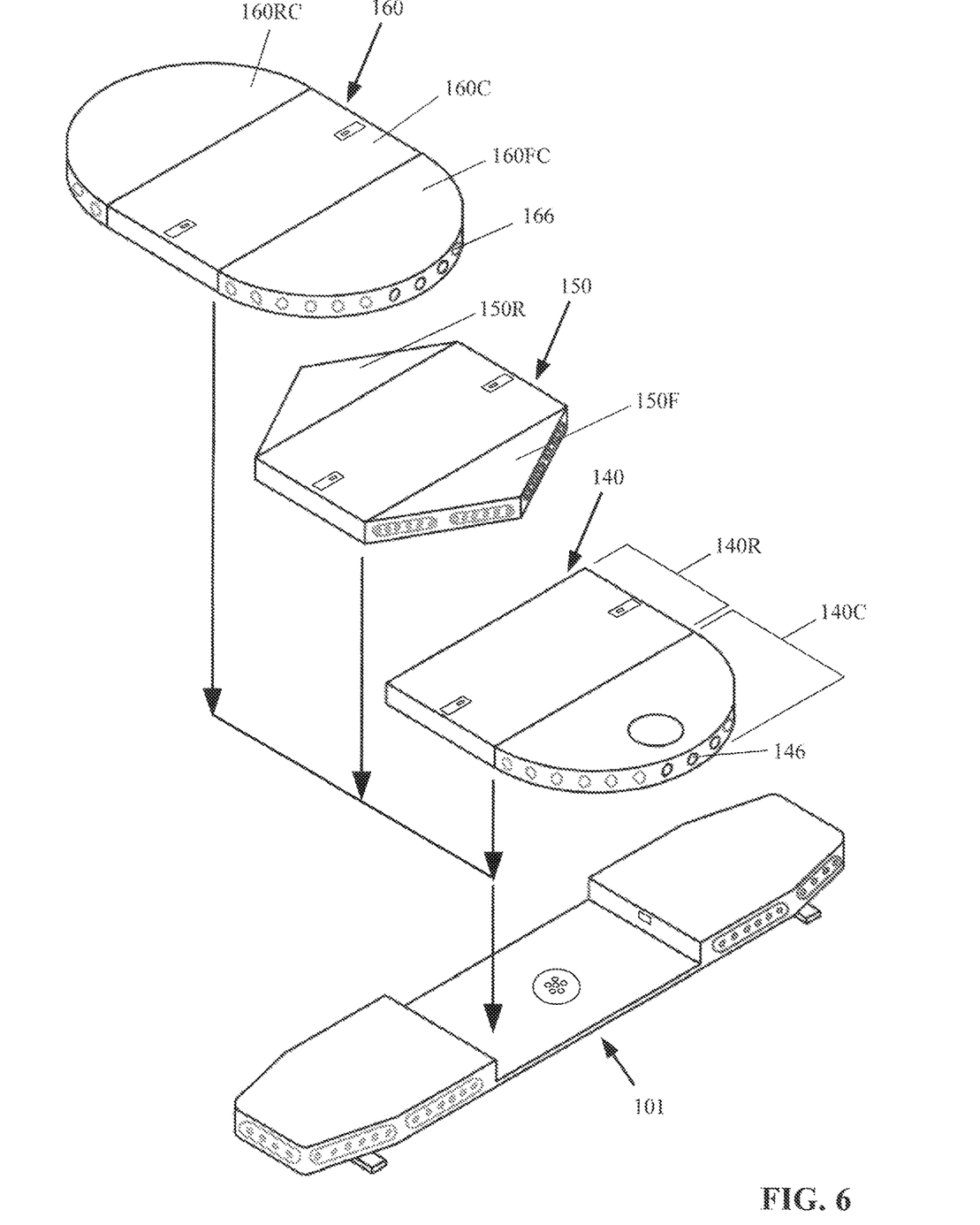
FIG. 6 is an exploded view showing the base member of FIG. 1, with three additional embodiments of interchangeable center section lighting modules of various different shapes, any one of which may be received within the recess of the base member.

FIG. is an exploded view showing the base member 100 and three additional embodiments of interchangeable center section lighting modules 140/150/160 having various different shapes which may be received within the recess of the base member.

Figure 7A:
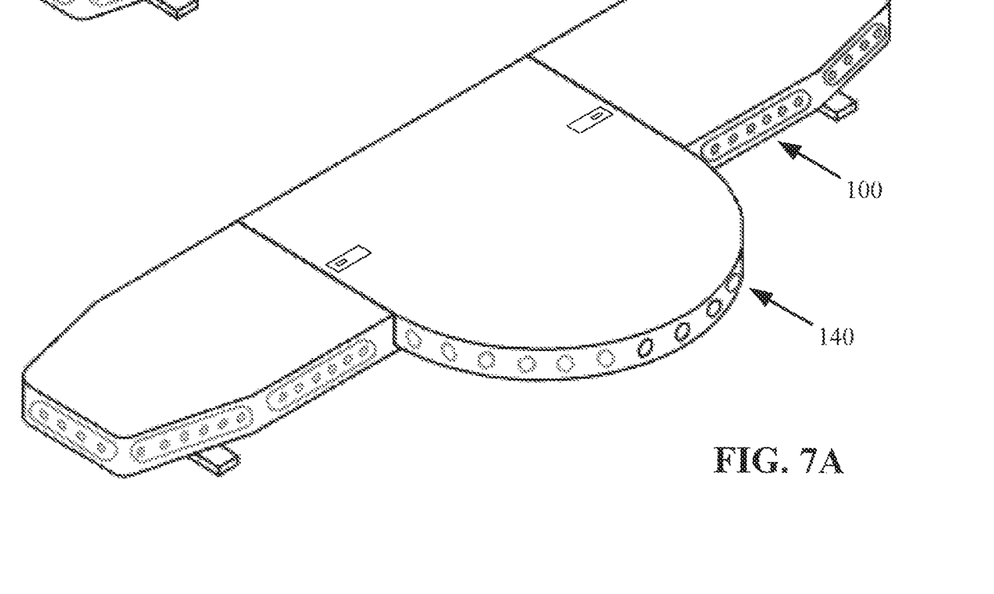
FIG. 7A is a perspective view of the base member of FIG. 1 shown with one of the embodiments of center section lighting modules of FIG. 6 received within the recess of the base member.

The center section module 140 may have a rectangular portion 140R that may be inserted into the recess of the base member 100 as disclosed hereinabove for the other rectangular-shaped modules, and may also have a semi-circular portion 140C protruding from the front of the rectangular portion. In one embodiment, the rectangular portion may transition into the semicircular portion without any seam appearing therebetween. The semi-circular portion 140C may have a plurality of lights 146 distributed along its exposed peripheral surface, which semi-circular periphery may thus provide more densely/distributed visible light spread throughout the front and lateral sides of the vehicle. The center section module 140 is shown installed, in the base member 100 within FIG. 7A.

Figure 7B:
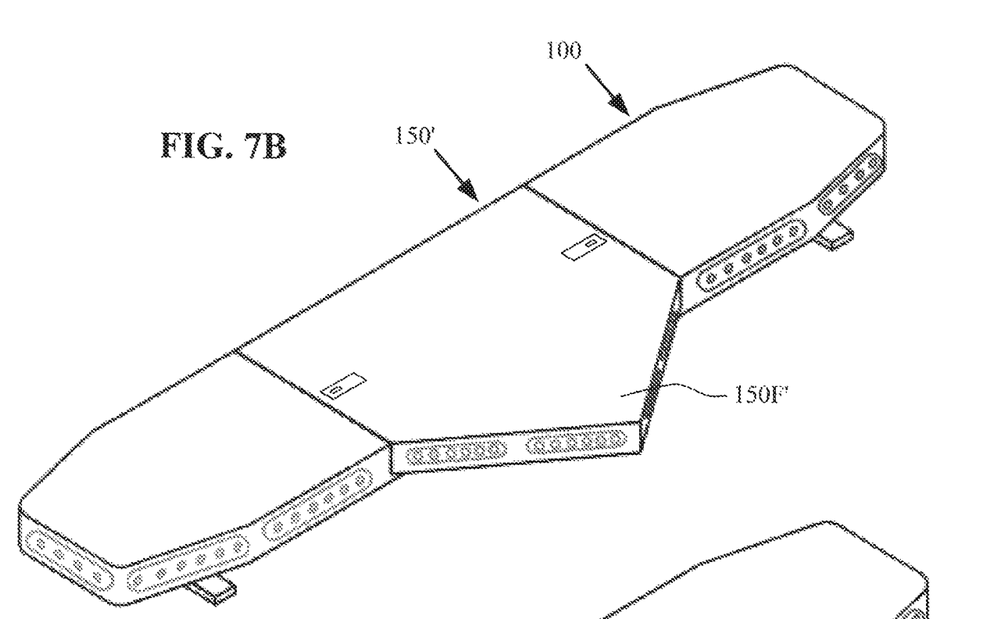
FIG. 7B is a perspective view of the base member of FIG. 1 shown with another one of the embodiments of center section lighting modules of FIG. 6 received within the recess of the base member.

FIG. 6 also shows a center section module 150 that may have a rectangular portion 140R that may be inserted into the recess of the base member 100 as disclosed hereinabove, and may also have a forward protruding portion 150F protruding from one side of the rectangular portion, and a rear protruding portion 150R protruding from the other side of the rectangular portion. The overall shape of the center section module 150 may thus be hexagonal. The dual angled sides, with one or more lights thereon, for each of the forward protruding portion 150F and the rear protruding portion 150R may also serve to provide more densely/distributed visible light spread throughout the front, and rear, and lateral sides of the vehicle. A variation on this embodiment is module 150', shown installed in the base member 100 in FIG. 7B, and which may only have the forward protruding portion 150F' protruding from one side of the rectangular portion.

Figure 8B:
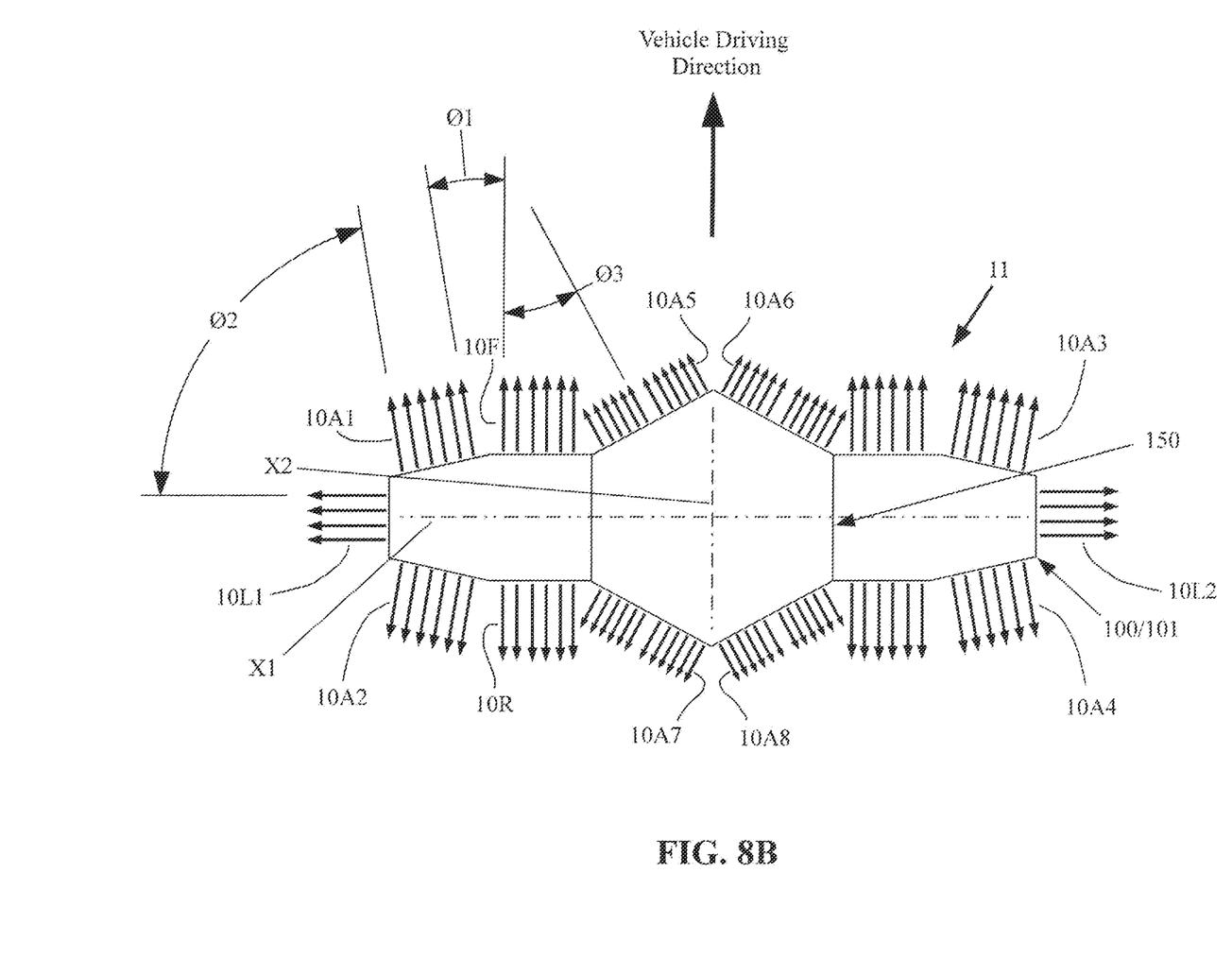
FIG. 8B is a top view of the base member and one of the center section lighting modules shown in FIG. 6, after being installed with respect to the base member, and showing the lighting directions produced therefrom.

Therefore, as seen in FIG. 8B, the modular light bar 11 formed by the combination of the base member 100 and the interchangeable center section lighting module 150 may have a light directional capability that may include:

all of the above-noted light directions for the first light bar end section and the second light bar end section;

one or more lights on the first surface of the rectangular center section lighting module 150 directed in a direction 10A5 at an acute angle to the forward direction 10F, being angled towards the first lateral direction 10A1, which may be at an angle ⊖3 to the forward direction 10F, with ⊖3 being between 10 degrees and 80 degrees in one embodiment, and between 15 degrees and 75 degrees in another embodiment, and between 20 degrees and 45 degrees in yet another embodiment (note other angular ranges may be used in other embodiments);

one or more lights on the second surface of the rectangular center section lighting module 150 directed at a direction 10A6 at a second acute angle, which may be the same numeric angular value as the acute angle for the angular direction 10A5, but is angled towards the second lateral direction 10A1, (e.g., the direction 10A6 may be the direction 10A5 mirrored about the short axis X2);

one or more lights on the third surface of the rectangular center section lighting module 150 directed at a direction 10A7 at an acute angle, which may be the same numeric-angular value as the acute angle for the direction 10A5, but is with respect to the rearward direction 10R, and may be angled towards the first lateral direction 10L1 (e.g., the direction 10A7 may be the direction 10A5 mirrored about the long axis X1); and one or more lights on the fourth surface of the rectangular center section lighting module 150 directed at a direction 10A8 at an acute angle, which may be the same numeric angular value as the acute angle for the direction 10A6, but is with respect to the rearward direction 10R, and may be angled towards the second lateral direction 10L2 (e.g., the direction 10A8 may be the direction 10A6 mirrored about the long axis X1).

The center section module 160 shown in FIG. 6 may be formed the same as module 140, except that in addition to a forward protruding semi-circular portion 160FC, it may additionally have a rear protruding semi-circular portion 160RC protruding from the rear side of the rectangular portion 160R, and may generally have a race-track shaped periphery. Each of the forward and rearward protruding semi-circular portions 160FC and 160RC may have a plurality of lights 166 distributed about its peripheral surface.

Figure 8C:
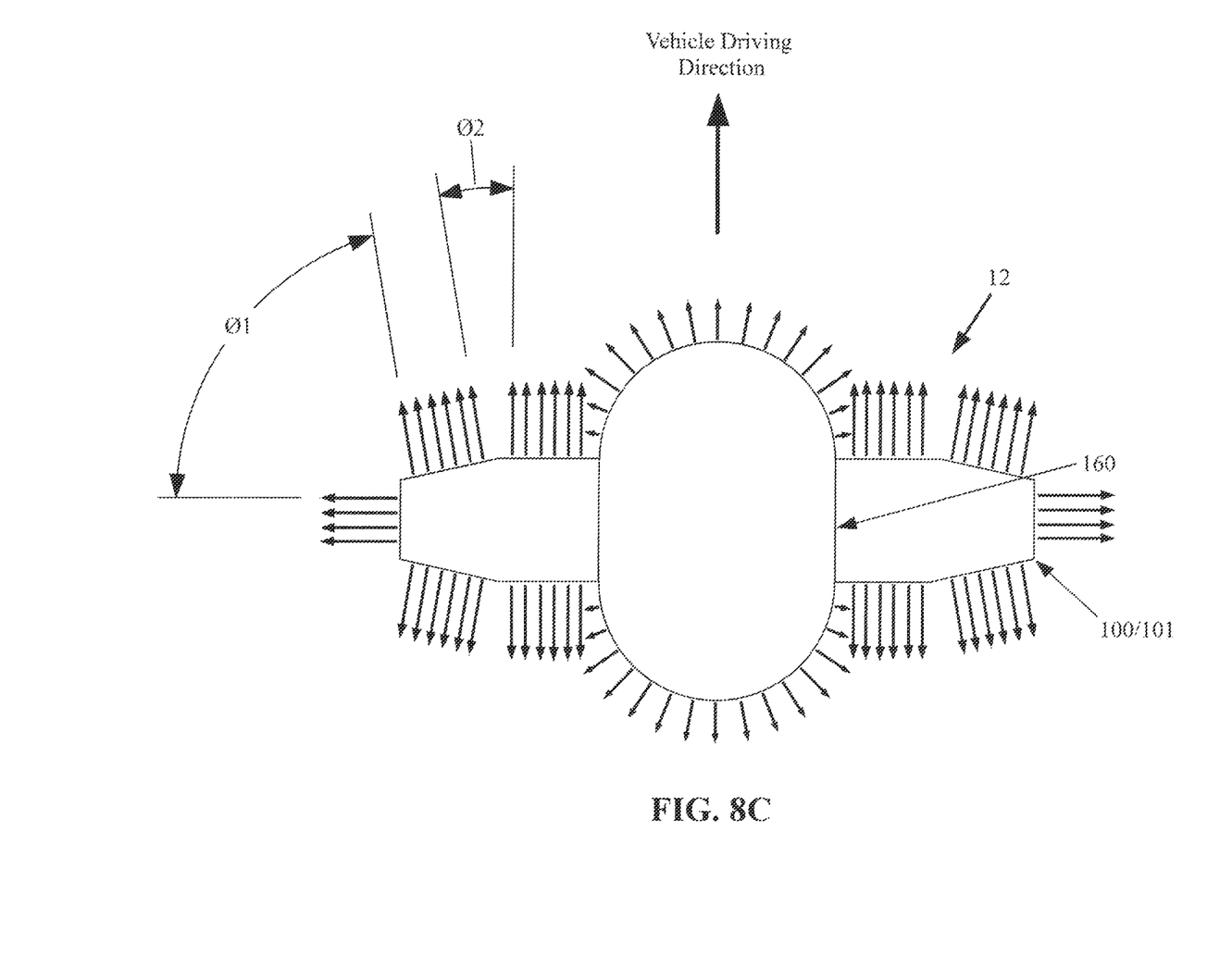
FIG. 8C is a top view of the base member and another one of the center section lighting modules shown in FIG. 6, after being installed with respect to the base member, and showing the lighting directions produced therefrom.

Therefore, as seen in FIG. 8C, the modular light bar 12 formed by the combination of the base member 100 and the interchangeable center section lighting module 160 may have light directional capability that may include:

all of the above-noted light directions for the first light bar end section and the second light bar end section; and a plurality of lights on the first semi-circular surface of the race-track shaped center section lighting module 160 that may be equally spaced and directed in a plurality of directions between the first lateral direction and the second lateral direction, each being angled less than 90 degrees with respect to the forward direction 10F, e.g., a first light in the forward direction 10F and seven pairs of lights spaced therefrom every 11.25 degrees (note that other numbers of lights and angles to provide equal spacing may alternatively be used, and the spacing need not be equal in other embodiments);

a plurality of lights on the second semi-circular surface of the race-track shaped center section lighting module 160 that may be equally spaced and directed in a plurality of directions between the first lateral direction and the second lateral direction, each being angled less than 90 degrees with respect to the rearward direction 10R, e.g., a first light in the rearward direction 10R and seven pairs of lights spaced therefrom every 11.25 degrees (note that other numbers of lights and angles to provide equal spacing may alternatively be used).

Figure 9:
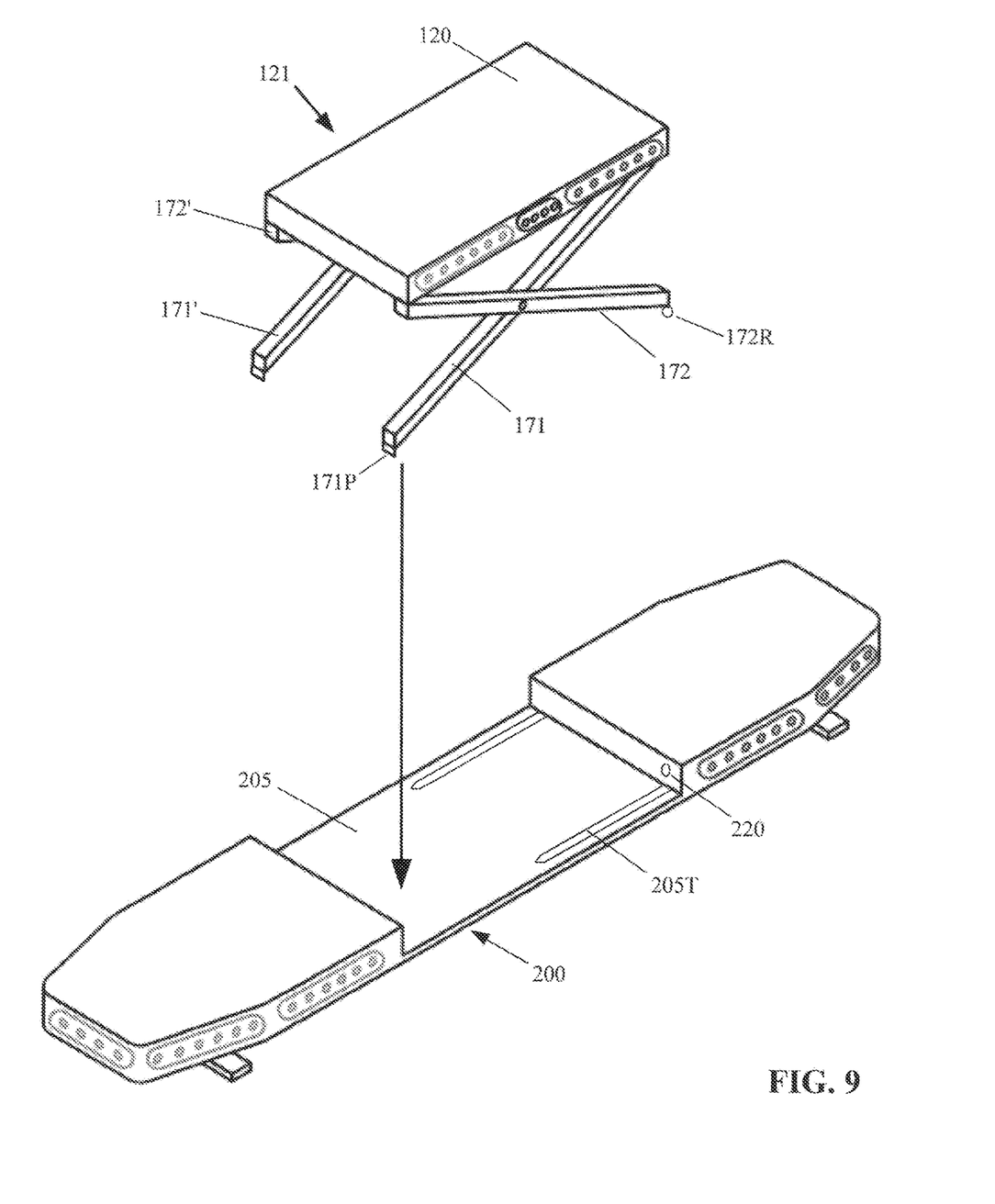
FIG. 9 is an exploded view showing a modified version of the base member of FIG. 1, with another embodiment of an interchangeable center section lighting module, shown prior to being received within the recess of the base, which center section lighting module is configured to be actuated to elevate to a height above the light bar base member.
Figure 10:
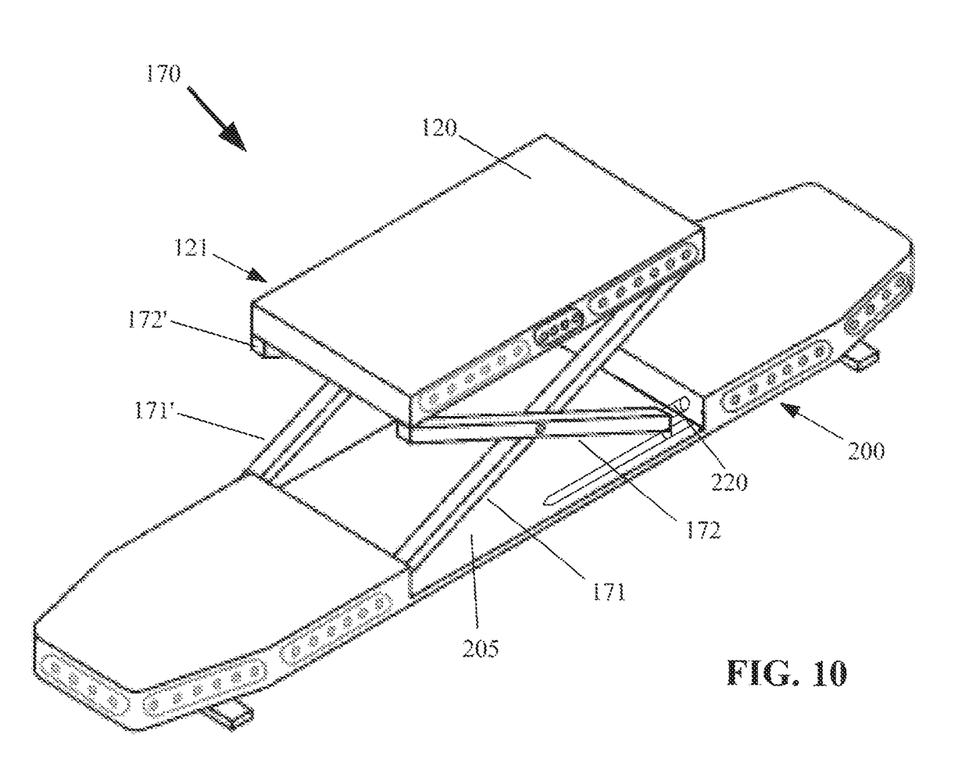
FIG. 10 shows the actuale center section of FIG. 9 after being movably secured to the base member shown therein, and is shown at an elevated position.

FIG. 9 and FIG. 10 illustrate another light bar embodiment, which may include a base member 200 and a center section lighting module 121. Base member 200 may be formed the same as, or similar to, base member 100, but may also be configured to accommodate movable mounting thereto of folding arms. Also, center section module 121 may be formed the same as, or similar to, center section 120, but may also have a first pair of folding arms 171 and 172, and a second pair of folding arms 171' and 172', each pivotally mounted to the center section module using any suitable hardware for pivotal mounting. This embodiment is shown in the exploded view of FIG. 9, prior to coupling of the arms to the base member 200. One end of one of the arms for each pair (e.g., arms 172 and 172') may be pivotally mounted to the support member 205 of the base member 200, and may use a pin (e.g., pin 171P on arm 171) for mounting to a clevis, or may use any other suitable pivotal mounting feature/arrangement. The other end of the other arm for one or both pairs (e.g., arm 171 and/or arm 171') may be secured to an actuator 220 that may be predominantly housed within one of the end sections, and may also have a roller 172R that may be configured to provide sliding movement with respect to a track 205T on the support portion 205 of the base member 200, or with respect to just a flat surface thereon. The actuator may be any suitable actuator, including, but not limited to, a linear actuator. Other actuator types (e.g. a rotary actuator, etc.) may alternatively be used in conjunction with different mechanisms to appropriately drive the arms 171/171' to elevate the center section module 121. When the actuator 220 is energized, it may extend linearly and may cause the lower end of the arms 171 and 171' to translate towards the lower end of the other arms (172 and 172'), which may cause the center section module 120 to become elevated with respect to the support member 205, and thus may be elevated with respect to the roof of the vehicle. The elevated position may serve to provide greater visibility of the lights to motorists that may be at a greater distance away from the emergency response vehicle, and it may also enable motorists to see the lights better, because they may be positioned well above the vehicle(s) that may be directly in front of them. When the center section module 120 is not elevated with respect to the support member 205, the base member 200 and center section module 121 may appear outwardly the same as the base member 100 and center section module 120 shown in FIGS. 4-5, but being without the latch shown therein.

It should be noted that although only one embodiment of the base member 100/200 is shown herein, having a four-sided periphery for each of its end sections 103 and 104, other shapes for the end sections may also be used. A plurality of different base members may be configured and be used to receive any of the center section modules disclosed herein, in addition to any other center section modules that may be similarly formed and found to be advantageous.

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A modular light bar, for mounting on an emergency vehicle, said modular light bar configured to change an external shape and corresponding light directional capability thereof using a plurality of different interchangeable lighting modules, said modular light bar comprising:
a base member having a first end and a second end, said base member comprising:
a first light bar end section configured to begin at said first end and to extend part way toward said second end; said first light bar end section comprising one or more lights on at least a portion thereof;
a second light bar end section configured to begin at said second end and to extend part way toward said first end; said second light bar end section comprising one or more lights on at least a portion thereof; and
a support portion configured to interconnect said first light bar end section to said second light bar end section, and to provide a gap therebetween;
a center section lighting module comprising a plurality of lights in a first light directional arrangement, and having a length configured for said center section lighting module to be removably seated on the emergency vehicle within said gap between said first light bar end section and said second light bar end section in a seated position;
a latch configured to releasably secure said center section lighting module in said seated position; and
wherein said latch provides for quick release and interchangeability of said center section lighting module with a second said center section lighting module having a second light directional arrangement to change an external shape and corresponding light directional capability of said modular light bar.

2. The modular light bar according to claim 1 wherein said light directional capability is without any rotating elements.

3. The modular light bar according to claim 2,
wherein said base member comprises an electrical connector;
wherein said center section lighting module comprises an electrical connector configured to connect and electrically couple to said electrical connector of said base member to electrically couple said plurality of lights of said center section lighting module to said base member; and
wherein said electrical connector of said base member and said electrical connector of said center section lighting module each comprise quick disconnect electrical connectors, and wherein said quick disconnect electrical connectors and said latch provide quick interchangeability of said center section lighting module with a second said center section lighting module having a second light directional arrangement to change an external shape and corresponding light directional capability of said modular light bar.

4. The modular light bar according to claim 2,
wherein each of said first and second light bar end sections comprises a substantially flat upper surface, with said substantially flat upper surfaces of said first and second light bar end sections being substantially coplanar;

wherein said support portion comprises a flat upper surface being substantially parallel to said flat upper surfaces of said first and second light bar end sections, said flat upper surface of said support portion being separated from said substantially coplanar upper surfaces of said first and second light bar end sections by a distance; and wherein said center section lighting module comprises a substantially flat bottom surface and a substantially flat and parallel upper surface separated therefrom by a height; and wherein said height is substantially the same as said distance.

5. The modular light bar according to claim 4, wherein said interchangeable center section lighting module comprises a rectangular cross-sectional shape with one or more lights on a first surface thereon and one or more lights on a second surface thereof.

6. The modular light bar according to claim 5, wherein said light directional capability comprises:

said one or more lights on said first light bar end section comprising:
one or more lights directed in a forward direction;
one or more lights directed in a first lateral direction;
one or more lights directed at an acute angle to the forward direction, being angled towards the first lateral direction;
one or more lights directed in a rearward direction; and
one or more lights directed at the acute angle with respect to the rearward direction, being angled towards the first lateral direction; and said one or more lights on said second light bar end section comprising:
one or more lights directed in the forward direction;
one or more lights directed in a second lateral direction;
one or more lights directed at the acute angle to the forward direction, being angled towards the second lateral direction;
one or more lights directed in the rearward direction; and
one or more lights directed at the acute angle to the rearward direction, being angled towards the second lateral direction;

said one or more lights on said first surface of said rectangular center section module directed in the forward direction; and said one or more lights on said second surface of said rectangular center section module directed in the rearward direction.

7. The modular light bar according to claim 4, wherein said interchangeable center section lighting module comprises a hexagonal cross-sectional shape with one or more lights on a first surface thereon, one or more lights on a second surface thereof, one or more lights on a third surface thereon, and one or more lights on a fourth surface thereof.

8. The modular light bar according to claim 7, wherein said light directional capability comprises:

said one or more lights on said first light bar end section comprising:
one or more lights directed in a forward direction;
one or more lights directed in a first lateral direction;
one or more lights directed at an acute angle to the forward direction, being angled towards the first lateral direction;
one or more lights directed in a rearward direction; and
one or more lights directed at the acute angle with respect to the rearward direction, being angled towards the first lateral direction; and said one or more lights on said second light bar end section comprising:
one or more lights directed in the forward direction;
one or more lights directed in a second lateral direction;
one or more lights directed at the acute angle to the forward direction, being angled towards the second lateral direction;
one or more lights directed in the rearward direction; and
one or more lights directed at the acute angle to the rearward direction, being angled towards the second lateral direction;

said one or more lights on said first surface of said hexagonal center section module directed at a second acute angle to the forward direction, being angled towards the first lateral direction;

said one or more lights on said second surface of said hexagonal center section module directed at the second acute angle to the forward direction, being angled towards the second lateral direction;

said one or more lights on said third surface of said hexagonal center section module directed at the second acute angle with respect to the rearward direction, being angled towards the first lateral direction; and said one or more lights on said fourth surface of said hexagonal center section module directed at the second acute angle with respect to the rearward direction, being angled towards the second lateral direction.

9. The modular light bar according to claim 4, wherein said interchangeable center section lighting module comprises a race-track shaped cross-section, with a plurality of lights on a first semi-circular surface thereof, and a plurality of lights on a second semi-circular surface thereof.

10. The modular light bar according to claim 9, wherein said light directional capability comprises:

said one or more lights on said first light bar end section comprising:
one or more lights directed in a forward direction;
one or more lights directed in a first lateral direction;
one or more lights directed at an acute angle to the forward direction, being angled towards the first lateral direction;
one or more lights directed in a rearward direction; and
one or more lights directed at the acute angle with respect to the rearward direction, being angled towards the first lateral direction; and said one or more lights on said second light bar end section comprising:
one or more lights directed in the forward direction;
one or more lights directed in a second lateral direction;
one or more lights directed at the acute angle to the forward direction, being angled towards the second lateral direction;
one or more lights directed in the rearward direction; and
one or more lights directed at the acute angle to the rearward direction, being angled towards the second lateral direction;

said plurality of lights on said first semi-circular surface of said race-track shaped center section module directed at a plurality of angles with respect to the forward direction between the first lateral direction and the second lateral direction; and said plurality of lights on said second semi-circular surface of said race-track shaped center section module directed at a plurality of angles with respect to the rearward direction between the first lateral direction and the second lateral direction.

* * * * *